(12) United States Patent
Fitzgibbon et al.

(10) Patent No.: US 6,989,767 B2
(45) Date of Patent: Jan. 24, 2006

(54) OBSTACLE DETECTOR-RESPONSIVE MOVABLE BARRIER OPERATOR APPARATUS AND METHOD

(75) Inventors: James J. Fitzgibbon, Batavia, IL (US); Edward Laird, Lombard, IL (US)

(73) Assignee: The Chamberlain Group, Inc., Elmhurst, IL (US)

(*) Notice: Subject to any disclaimer, the term of this patent is extended or adjusted under 35 U.S.C. 154(b) by 208 days.

(21) Appl. No.: 10/447,662

(22) Filed: May 29, 2003

(65) Prior Publication Data

US 2004/0239269 A1 Dec. 2, 2004

(51) Int. Cl.
*G08G 1/095* (2006.01)

(52) U.S. Cl. .................... 340/908; 340/686.1; 340/665; 340/668

(58) Field of Classification Search .............. 340/908, 340/686.1, 687, 686.2, 665, 668; 318/255, 318/282
See application file for complete search history.

(56) References Cited

U.S. PATENT DOCUMENTS

| | | | |
|---|---|---|---|
| 5,929,580 A | | 7/1999 | Mullet et al. |
| 6,107,765 A | * | 8/2000 | Fitzgibbon et al. ......... 318/266 |
| 6,133,703 A | * | 10/2000 | Fitzgibbon et al. ......... 318/445 |
| 6,326,751 B1 | | 12/2001 | Mullet et al. |
| 6,588,829 B2 | * | 7/2003 | Long et al. ................. 296/155 |
| 2003/0178957 A1 | | 9/2003 | Fitzgibbon et al. |
| 2003/0210005 A1 | | 11/2003 | Murray |
| 2004/0012480 A1 | | 7/2004 | Jurado et al. |

FOREIGN PATENT DOCUMENTS

| | | |
|---|---|---|
| EP | 0 410 204 A2 | 7/1990 |
| EP | 1 304 442 A2 | 10/2002 |

OTHER PUBLICATIONS

British Search Report for British patent application GB0412065.5 dated Oct. 4, 2004.

* cited by examiner

*Primary Examiner*—Daryl C. Pope
(74) *Attorney, Agent, or Firm*—Fitch, Even, Tabin & Flannery

(57) ABSTRACT

A movable barrier operator (10) can have at least two automatic modes of operation. These modes of operation can differ from one another at least with respect to their respective utilized maximum-applied-force thresholds, such that one of the modes of operation correlates to a reduced maximum-applied-force threshold. Selection between these available maximum-applied-force thresholds can be based, at least in part, upon whether an obstacle detector is operably coupled to the movable barrier operator. In one embodiment, a primary controller (30) and a secondary controller (31) can be utilized to effect the controlled selection and usage of the available maximum-applied-force thresholds. In another embodiment, maximum permitted speed of travel for the movable barrier can also be determined, at least in part, as a function of whether an obstacle detector is available to the movable barrier operator.

59 Claims, 4 Drawing Sheets

US 6,989,767 B2

OBSTACLE DETECTOR-RESPONSIVE MOVABLE BARRIER OPERATOR APPARATUS AND METHOD

TECHNICAL FIELD

This invention relates generally to movable barrier operators and more particularly to movable barrier operators that can work in association with obstacle detection information.

BACKGROUND

Movable barriers of various kinds are known in the art, including but not limited to horizontally and vertically sliding barriers, vertically and horizontally pivoting barriers, single-piece barriers, multi-piece or segmented barriers, partial barriers, complete barriers, rolling shutters, and various combinations and permutations of the above. Such barriers are typically used to control physical and/or visual access to or via an entryway (or exit) such as, for example, a doorway to a building or an entry point for a garage.

In many cases, a motor or other motion-imparting mechanism is utilized to effect selective movement of such a movable barrier. A movable barrier operator will then usually be utilized to permit control of the motion-imparting mechanism. In some cases a user may control the movable barrier operator by assertion of one or more control surfaces that are physically associated with the movable barrier operator. In other cases such control can be effected by the transmission of a wireless remote control signal to the movable barrier operator.

Such movable barrier operators often serve in part to monitor one or more parameters that correspond to force as is applied when moving such a movable barrier. On the one hand, it is desirable to supply sufficient force to ensure that the movable barrier will be able to successfully traverse its entire travel path. This can require, in turn, the need to apply a higher then normally required sufficient force in order to permit the movable barrier to move through areas that, for a variety of possible reasons, present greater resistance to movement of the movable barrier. On the other hand, a moving movable barrier can potentially come into contact with an obstacle.

When an obstacle occasions resistance to movement of the movable barrier, significantly increasing the applied force can potentially lead to damaging the movable barrier, the obstacle, or both. Consequently, many movable barriers closely monitor applied force in order to ascertain when a potentially inappropriate level of force is being applied to thereby permit a safe response.

To facilitate this monitoring, a maximum-force-applied limit will often be used to serve as an upper limit and reference value. Such a limit may be wholly static, manually alterable by a user, and/or automatically dynamically set and/or adjustable by the movable barrier operator itself.

Obstacle detectors are also known in the art Such detectors serve to detect the likely presence of such an obstacle. When an obstacle is detected, the movable barrier operator can then take proactive steps to avoid damage to the movable barrier and to the obstacle. It is generally understood and accepted that a movable barrier operator having a corresponding obstacle detector can safely use a relatively high maximum-force-applied limit, as the risk potentially associated with the higher limit is safely mitigated by the availability of the obstacle detector. Conversely, when a movable barrier operator does not have a corresponding obstacle detector, the corresponding maximum-force-applied limit will tend to be a lower value in order to better minimize the risk of damage should contact with an obstacle occur.

Manufacturers and installers tend to prefer flexible and multi-feature capable movable barrier operator platforms, as this eases inventory and manufacturing issues, permits better economies of scale, simplifies installation and servicing knowledge and training needs, and so forth. Unfortunately, such a desire conflicts with the issues noted above regarding the use of relatively lower and higher maximum-force-applied limits depending upon the availability of an obstacle detector. Such a need tends to urge such manufacturers towards fielding two or more movable barrier operator platforms in order to best support these divergent needs. It may also be noted that other pressures, including legal, regulatory, and/or certification requirements or standards can also presently influence such manufacturers towards multiple divergent and incompatible platforms to support the use of differing maximum-force-level practices depending upon the use of obstacle detectors.

BRIEF DESCRIPTION OF THE DRAWINGS

The above needs are at least partially met through provision of the obstacle detector responsive movable barrier operator apparatus and method described in the following detailed description, particularly when studied in conjunction with the drawings, wherein.

Figure 1:
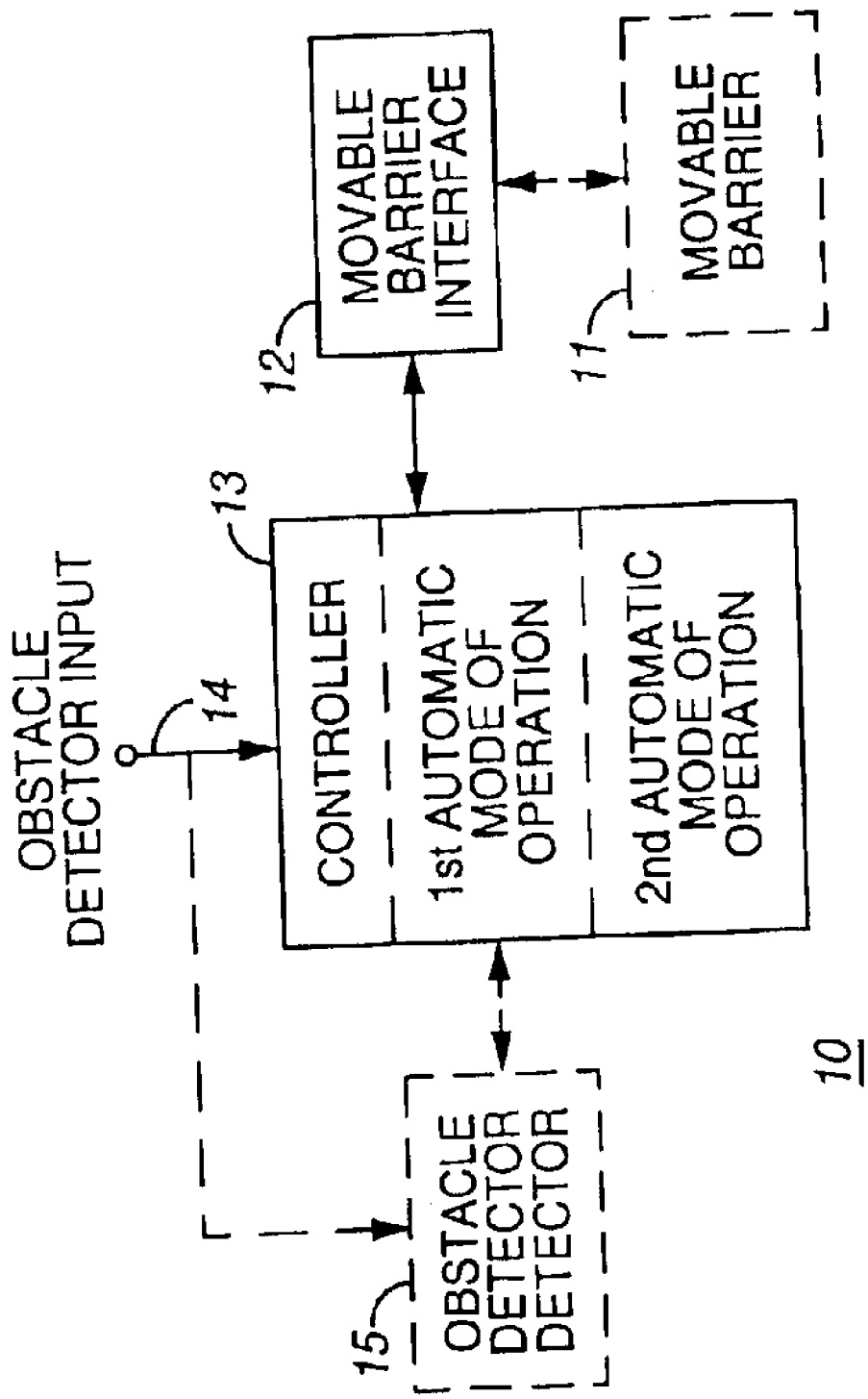
FIG. 1 comprises a block diagram of a movable barrier operator as configured in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a movable barrier operator has a controller that includes an obstacle detection input. This operator has at least a first and a second automatic mode of operation. In the first automatic mode of operation, the controller operates a corresponding movable barrier interface in accordance with a first predetermined parameter regarding a first maximum permitted application of force. In a preferred embodiment, this first automatic mode of operation governs when the obstacle detection input is not operably coupled to an obstacle detector. In the second automatic mode of operation, the controller operates a corresponding movable barrier interface in accordance with a second predetermined parameter regarding a second maximum permitted application of force when the obstacle detection input operably couples to an obstacle detector. In a preferred approach, the second parameter will correspond to a higher maximum permitted application of force than will the first parameter.

Depending upon operational needs and/or the anticipated application, a wide variety of obstacle detectors can be supported in this fashion, including optically-based obstacle detectors, pressure-sensitive obstacle detectors, sonically-based obstacle detectors, and radio-frequency based obstacle detectors. These embodiments will also support the use of a plurality of obstacle detectors if so desired.

In one embodiment, the movable barrier operator can be comprised of two controllers. A primary controller can control movement of the movable barrier through use of a first excess force threshold. A secondary controller can control movement of the movable barrier through use of a second excess force threshold when an obstacle detector is not operably coupled to the movable barrier operator. So configured, the primary controller can utilize a relatively high maximum-force-applied limit when using an obstacle detector and the secondary controller can override the primary controller and force the use of a reduced value maximum-force-applied limit when not using an obstacle detector. Such an arrangement can have particular value when fail-safe needs or requirements are relatively significant.

So configured, a single movable barrier operator platform can be successfully used in a variety of application settings, including use both with and without one or more obstacle detectors. Relatively safe yet reasonably effective operation can be assured substantially regardless of whether an obstacle detector is available and utilized. This in turn permits various economies of scale to be achieved while also aiding to ensure reduced and more efficient installation, maintenance, and servicing training and instruction requirements.

Pursuant to yet another embodiment, as potentially applied force can also be influenced by a present speed of movement of a movable barrier, the above described processes can be supplemented or supplanted by applying a reduced permitted maximum speed of travel when an obstacle detector is not otherwise available. Pursuant to this approach, for example, a movable barrier would be moved more slowly when no obstacle detectors are used than when an obstacle detector governs the operation of the movable barrier operator. So configured, since force equals mass times acceleration, the force of impact in event of collision between a moving-movable barrier and an obstacle will be less under such circumstances.

Referring now to the drawings, and in particular to FIG. 1, a movable barrier operator 10 couples to at least one corresponding movable barrier 11 via a movable barrier interface 12 (including, but not limited to chain drive mechanisms, belt drive mechanisms, gear drive mechanisms, and so forth). A controller 13 serves to control the operation of the movable barrier interface 12, and hence the selective movement of the movable barrier 11, in accordance with well understood prior art technique. In a preferred embodiment, the controller 13 has at least a first and second automatic mode of operation. In particular, pursuant to the first automatic mode of operation, the controller 13 operates the movable barrier interface 12 in accordance with a first predetermined parameter regarding a first maximum amount of permitted applied force. Pursuant to the second automatic mode of operation, the controller 13 operates the movable barrier interface 12 in accordance with a second predetermined parameter regarding a second maximum amount of permitted applied force, which second maximum amount of permitted applied force represents a greater amount of applied force than the first maximum permitted amount of applied force. Pursuant to these embodiments, the controller 13 automatically selects between such modes of operation as a function, at least in part, of whether obstacle detector information is available to the movable barrier operator 10.

The first and second predetermined parameters can be provided in various ways. For example, separate and discrete values for such parameters can be stored and retained for ready access and use by the controller 13. As another example, a plurality of candidate values can be provided in a look-up table or similar mechanism such that the controller 13 can select a particular parameter at any given time based upon whatever selection criteria is appropriate to the application. As yet another example, one of the parameters can be stored as a discrete value and the remaining parameter (or parameters) can be calculated as a function of the stored parameter (for example, the second parameter can equal the first parameter as summed with a third parameter such as a predetermined or dynamically calculated offset value). And as yet another example, the parameters can be dynamically calculated as needed through use of provided algorithms of choice.

As indicated, these various operating modes can be selected as a function, at least in part, of whether obstacle detection information is available to the movable barrier operator 10. In this embodiment, to facilitate this detection, the controller 13 can include at least one obstacle detector input 14. Such an input 14 can be operably coupled to an obstacle detector (or detectors) (not shown) of choice, including but not limited to optically-based obstacle detectors, pressure-sensitive obstacle detectors, sonically-based obstacle detectors, and radio frequency-based obstacle detectors to name a few and as are generally well understood in the art Through such an input 14 the controller 13 can of course receive information regarding the detection of a potential obstacle in the path of the movable barrier 11 and can utilize such information to take such appropriate actions as may be desired in accordance with well understood prior art methodology. In addition, however, the controller 13 can itself ascertain whether an obstacle detector is coupled thereto and, based upon detecting the presence and availability of such a capability, can automatically choose to effect the second mode of operation described above during normal operations. So configured, the controller 13 can automatically use a higher permitted level of potentially applied force during movement of the movable barrier 11 when a supplemental protection device such as an obstacle detector is available. Conversely, when no such supplemental aid exists, the controller 13 can automatically use a reduced permitted level of potentially applied force to aid in ensuring the safety of objects in the vicinity.

In an alternative approach to self-sensing the availability of an obstacle detector, an obstacle detector detector 15 can be optionally provided and coupled to the controller 13. Such a detector can be a secondary controller as described below in more detail or such other platform as will effect the intent and purposes of detecting and indicating to the controller 13 the presence of an obstacle detector and/or otherwise causing or forcing a particular mode of operation for the controller 13 (or for the movable barrier operator 10 in general) in response to detecting particular circumstances regarding the presence and/or absence of an obstacle detector. For example, such an obstacle detector detector 15 can serve to cause the movable barrier operator 10 to operate in a safety mode of operation when, for example, there is no obstacle detector available. In addition to utilizing a different permitted maximum applied force as described above, such a safety mode of operation can further include actions such as, but not limited to, stopping movement of a movable barrier, reversing movement of a movable barrier, or providing a visual, auditory, or other alarm.

Figure 2:
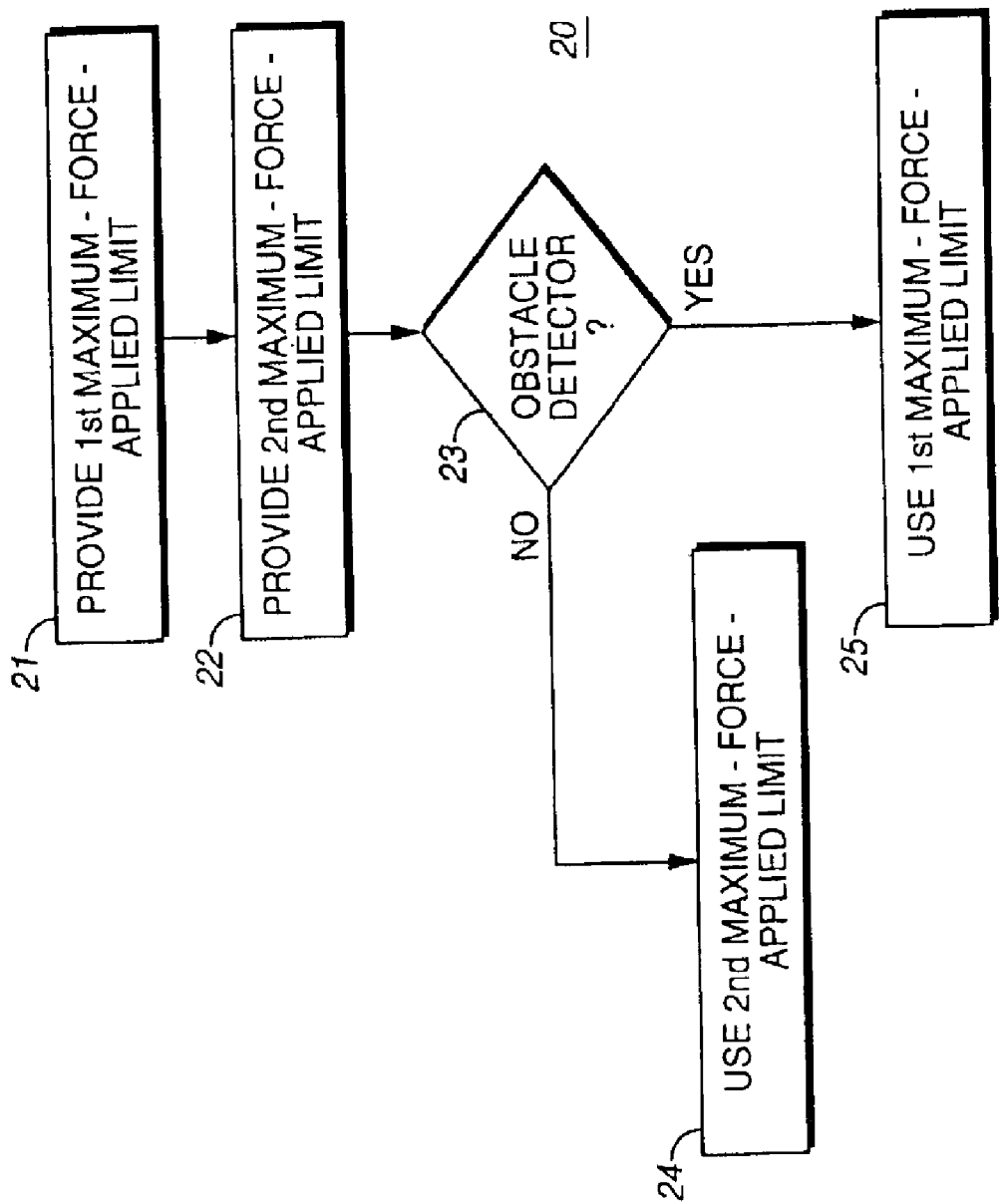
FIG. 2 comprises a flow diagram as configured in accordance with an embodiment of the invention.

Referring now to FIG. 2, such a movable barrier operator 10 can serve to effect a process 20 that provides 21 a first maximum-force-applied limit and that provides 22 a second maximum-force-applied limit Then, based upon whether an obstacle detector is detected 23, the process 20 directs automatic usage of either the first maximum-force-applied limit 25 or the second maximum-force-applied limit 24. Just as there are various ways by which the first and second limits can be provided as described earlier, there are also varying ways by which such limits can be applied during such a process 20. For example, in this illustration, the second maximum-force-applied limit represents a lesser force than does the first maximum-force-applied limit. Therefore, when using the second maximum-force-applied limit 24, it would be possible to use this second limit to the exclusion of the first maximum-force-applied limit 25 or in parallel therewith (as the lower limit will in effect preempt and override the availability of the first maximum-force-applied limit in any event). The latter option may have beneficial application, for example, when implementing this process with a movable barrier operator 10 that includes a separate obstacle detector detector 15 as described above.

Figure 3:
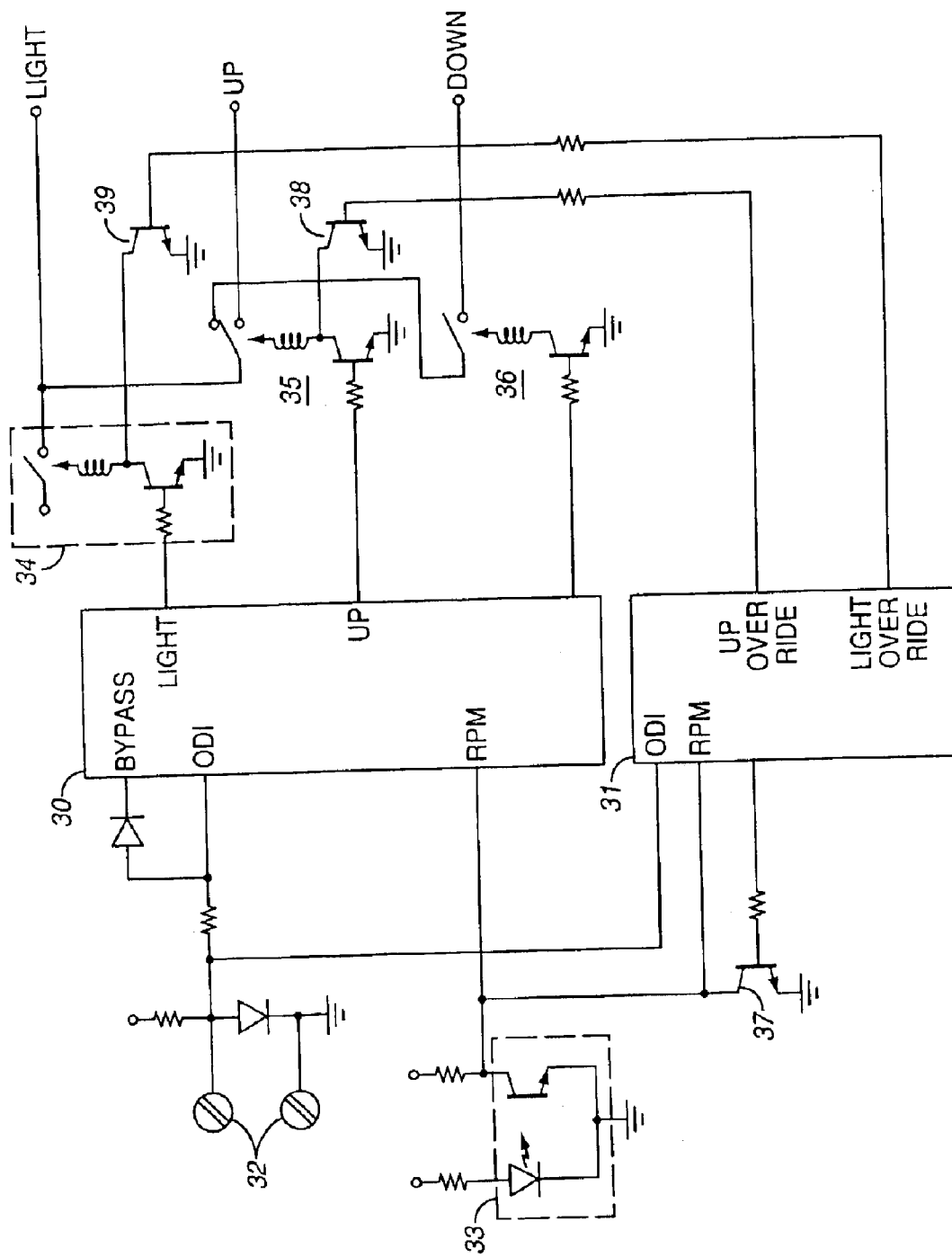
FIG. 3 comprises a schematic diagram of a movable barrier operator as configured in accordance with one embodiment of the invention.

As mentioned above, an obstacle detector detector, when used, can include use of a secondary controller. Referring now to FIG. 3, one embodiment for such an approach will be described. Pursuant to this approach, in general, a primary controller 30 uses a first predetermined parameter (typically representing a relatively high maximum permitted application of force) to control operation of the movable barrier interface and a second controller 31 uses a second predetermined parameter (typically representing a reduced maximum permitted application of force) to control operation of the movable barrier interface. Such controllers can be comprised of any programmable (or hard-wired and dedicated) platform as may be appropriate to suit the needs of a given application.

The primary controller 30 has an obstacle detection input (ODI) that couples appropriately to an input interface 32 for an obstacle detector (not shown). For example, in this embodiment, a pair of conductive screws 32 as may comprise a part of a peripheral connector block may be used for this purpose as is generally well understood in the art. So configured, the conductive leads of the obstacle detector are readily connected to and held in place by the screws 32 to thereby facilitate conductively coupling the obstacle detector to the primary controller 30. In this embodiment, this obstacle detector interface also couples in parallel to a corresponding input for the secondary controller 31. So configured, both the primary and the secondary controller 30 and 31 have access to the obstacle detector interface. This, in turn, permits the primary controller 30 to use obstacle detection information in the ordinary course of controlling the movable barrier interface while the secondary controller 31 can use its detection of the presence or absence of the obstacle detector to control the maximum applied force that can be effected by the movable barrier interface.

In this embodiment, a transistor 37 that is controlled by the secondary controller 31 provides a mechanism whereby control of the behavior of the primary controller 30 can be exerted, at least in part, by influencing an input to the primary controller 30. In particular, in this embodiment, this transistor 37, when switched into a conductive state, will ground the incoming signal that corresponds to or otherwise represents movement of the movable barrier (in particular, in this embodiment, revolutions-per-minute information as is provided by a revolutions-per-minute sensor 33). So configured, the secondary controller 31 has as a control strategy option the ability to divert this incoming signal from the primary controller 30.

In accord with general practice, various outputs of the primary controller 30 serve to selectively drive various relay driver/relay modules. For example, a first relay driver/relay 34 permits a light (such as a ceiling light in a garage) to be switched on. A second relay driver/relay 35 provides an "up" signal to the movable barrier interface to cause a vertically moving movable barrier to move upwardly. A third relay driver/relay 36 provides a "down" signal to the movable barrier interface to cause a vertically moving movable barrier to move downwardly. In this embodiment, the secondary controller 31 has its own relay driver transistors 39 and 38 to permit overriding actuation of the lighting and "up" commands. So configured, during ordinary operation, both the primary and the secondary controllers 30 and 31 can monitor applied force (for example, by monitoring the periodicity of the revolution-per-minute information from the revolutions-per-minute sensor 33).

When no obstacle detector has been attached to the corresponding interface 32 of the movable barrier operator, the secondary controller 31 will use a reduced point of comparison to determine whether and when an inappropriate amount of force is being exerted during movement of the movable barrier. When such a condition is sensed, the secondary controller 31 can override any "down" command that the primary controller 30 might then be simultaneously issuing and can further cause an "up" command to be provided instead to the movable barrier interface by actuating both of its relay driver transistors 38 and 39. In addition, if desired, the revolutions-per-minute information can be denied to the primary controller 30, which should also then cause the primary controller 30 to interpret the absence of such information with a corresponding stoppage of the movable barrier. This, in turn, should cause the primary controller 30 to itself halt issuing the "up" command (and, in a system where automatic reversing of the movable barrier is desired, to begin issuing the "down" command).

Via these various embodiments it can be seen that a movable barrier operator can be provided with a mechanism for causing a movable barrier to move and with a controller mechanism to control movement of the movable barrier by using a first excess force threshold when an obstacle detector is operably coupled to the controller mechanism and for controlling movement of the movable barrier by using a second excess force threshold (which corresponds to a smaller excess force as compared to the first excess force threshold) when an obstacle detector is not operably coupled to the controller mechanism. A single self-sensing controller or multiple sensors can be used as a suitable enabling platform. Other configurations are of course possible, particularly with respect to the nature, structure, and feature set of the outboard obstacle detector detector (or detectors) when such is provided.

Figures 4, 5:
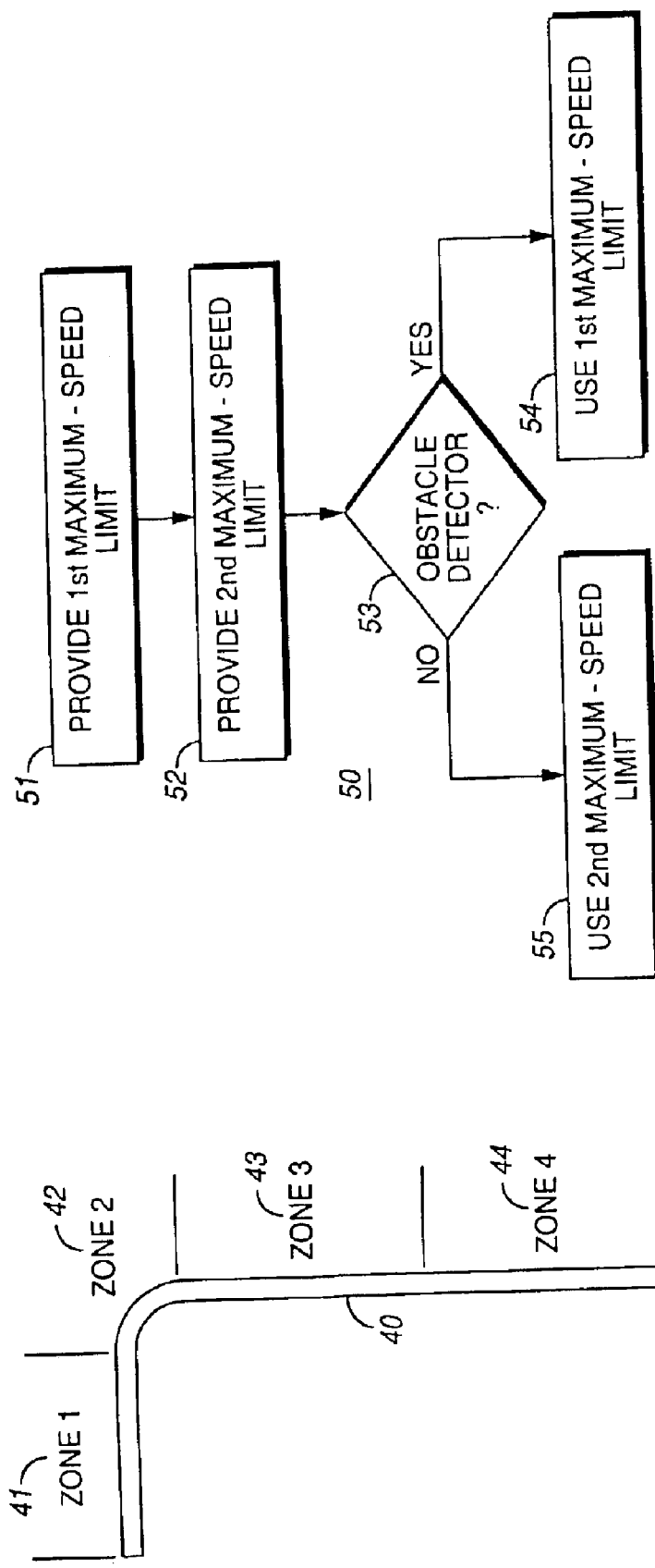
FIG. 4 comprises a side elevational schematic view of a movable barrier track/travel path.
FIG. 5 comprises a flow diagram as configured in accordance with another embodiment of the invention.

Pursuant to another embodiment, and referring now to FIG. 5, the above embodiments can be modified (or supplanted) by providing maximum permitted speed limits in addition to (or in lieu of) maximum-force-applied limits. To illustrate, this process 50 can provide 51 a first maximum-speed limit (comprising a maximum permitted speed by which the movable barrier can be moved at any given point during its travel between positions) and can further provide 52 a second maximum-speed limit. In this embodiment, the second maximum-speed limit will be lower than the first maximum-speed limit. These maximum-speed limits will preferably at least include a maximum permitted velocity but can also, when desired or appropriate, include a maximum permitted acceleration when changing from a lower present velocity to an increased present velocity.

Then, depending upon whether this process 50 detects 53 the availability of an obstacle detector, the process 50 proscribes usage 54 of the higher first maximum-speed limit (when an obstacle detector is available) or usage 55 of the lower second maximum-speed limit (when an obstacle detector is not available). Depending upon the needs of a given application, this selection can occur once, at the initiation of a specific travel event for a movable barrier, or can occur regularly (or even substantially continuously) during both quiescent and moving states for the corresponding movable barrier.

So configured, with or without the simultaneous use of maximum-force-applied limits, ultimately applied force due to a moving movable barrier can be at least partially controlled through control of the maximum permitted speed of the movable barrier as a function, at least in part, of whether an obstacle detector is available to the movable barrier operator.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

For example, some movable barrier operators use a plurality of potentially differing maximum force thresholds when moving a movable 10 barrier from, for example, a fully opened to a fully closed position. With reference to FIG. 4, the path of travel 40 for the movable barrier can be parsed into corresponding zones of travel (in this illustrative example, there are four such zones, including zone 1 41, zone 2 42, zone 3 43, and zone 4 44). It is possible (even likely) that somewhat differing amounts of force are ordinarily minimally required to successfully and reliably move a movable barrier along such a path. By conceptually dividing this path into zones, different characteristic required amounts of force as are typically necessary or usual to effect desired movement of the movable barrier through such zones can be separately noted and then utilized during ordinary operation to effect desired movement of the movable barrier. In such a case, the maximum allowed applied force can also be varied to track, at least to some degree, these varying amounts of ordinary characteristic force.

The teachings set forth above are applicable in such a case. For example, instead of only a single first and second predetermined parameter being provided, a plurality of first maximum-force-applied limits as correspond to various positions of movable barrier travel and a similar plurality of second maximum-force-applied limits as correspond to those same various positions of movable barrier travel can be provided. The movable barrier operator can then select to use the first or the second plurality of maximum-force-applied limits as a function, at least in part, of whether an obstacle detector is operably coupled to the movable barrier operator as otherwise set forth above.

We claim:

1. A movable barrier operator comprising:
   a movable barrier interface;
   a controller having an obstacle detection input and being operably coupled to the movable barrier interface, and further having at least a first and a second automatic mode of operation, wherein:
      pursuant to the first automatic mode of operation the controller operates the movable barrier interface in accordance with a first predetermined parameter regarding a first maximum permitted application of force when the obstacle detection input is not operably coupled to at least one obstacle detector; and
      pursuant to the second automatic mode of operation the controller operates the movable barrier interface in accordance with a second predetermined parameter regarding a second maximum permitted application of force when the obstacle detection input is operably coupled to at least one obstacle detector.

2. The movable barrier operator of claim 1 wherein the obstacle detection input comprises an optically-based obstacle detector input.

3. The movable barrier operator of claim 1 wherein the obstacle detection input comprises a pressure-sensitive obstacle detector input.

4. The movable barrier operator of claim 1 wherein the obstacle detection input comprises a sonically-based obstacle detector input.

5. The movable barrier operator of claim 1 wherein the obstacle detection input comprises a radio frequency-based obstacle detector input.

6. The movable barrier operator of claim 1 and further comprising an obstacle detector detector that is operably coupled to the controller.

7. The movable barrier operator of claim 6 wherein the obstacle detector detector comprises a secondary controller.

8. The movable barrier operator of claim 7 wherein the secondary controller comprises a programmable apparatus.

9. The movable barrier operator of claim 8 wherein the programmable apparatus comprises at least one of:
   a microprocessor;
   a microcontroller;
      a programmable gate array;
      a customized logic array.

10. The movable barrier operator of claim 1 wherein the controller includes:
    primary controller means for using the first predetermined parameter to control operation of the movable barrier interface;
    secondary controller means for using the second predetermined parameter to control operation of the movable barrier interface.

11. The movable barrier operator of claim 10 wherein the secondary controller means controls operation of the movable barrier interface, at least in part, by influencing an input to the primary controller means.

12. The movable barrier operator of claim 11 wherein the secondary controller means controls operation of the movable barrier interface, at least in part, by diverting an input to the primary controller means.

13. The movable barrier operator of claim 12 wherein the input comprises an input that receives information that corresponds to movement of a movable barrier.

14. The movable barrier operator of claim 13 wherein the information comprises revolutions-per-minute information.

15. The movable barrier operator of claim 1 wherein the second predetermined parameter is based, at least in part, on the first predetermined parameter.

16. The movable barrier operator of claim 15 wherein the second predetermined parameter comprises the first predetermined parameter as combined with a third parameter.

17. The movable barrier operator of claim 16 wherein the second predetermined parameter comprises the first predetermined parameter as summed with the third parameter.

18. The movable barrier operator of claim 1 and further wherein:
   pursuant to the first automatic mode of operation the controller operates the movable barrier interface in accordance with a plurality of first predetermined parameters regarding a plurality of first maximum permitted applications of force that are allowed to be applied at various positions of movable barrier travel when the obstacle detection input is not operably coupled to at least one obstacle detector; and
   pursuant to the second automatic mode of operation the controller operates the movable barrier interface in accordance with a plurality of second predetermined parameters regarding a plurality of second maximum permitted applications of force that are allowed to be applied at the various position of movable barrier travel when the obstacle detection input is operably coupled to at least one obstacle detector.

19. The movable barrier operator of claim 1 and further wherein:
   pursuant to the first automatic mode of operation the controller further operates the movable barrier interface in accordance with a third predetermined parameter regarding a first maximum permitted speed when the obstacle detection input is not operably coupled to at least one obstacle detector; and
   pursuant to the second automatic mode of operation the controller further operates the movable barrier interface in accordance with a fourth predetermined parameter regarding a second maximum permitted speed when the obstacle detection input is operably coupled to at least one obstacle detector.

20. The movable barrier operator of claim 19 wherein the third predetermined parameter corresponds to a maximum permitted speed that is greater than the maximum permitted speed that is associated with the fourth predetermined parameter.

21. A method for use with a movable barrier operator, comprising:
   providing a first maximum-force-applied limit;
   providing a second maximum-force-applied limit, which second maximum-force-applied limit is less than the first maximum-force-applied limit;
   automatically detecting when input from a remotely located obstacle detector is available;
   when input from a remotely located obstacle detector is available, automatically using the first maximum-force-applied limit but not the second maximum-force-applied limit when operating the movable barrier operator;
   when input from a remotely located obstacle detector is not available, automatically using the second maximum-force-applied limit when operating the movable barrier operator.

22. The method of claim 21 wherein providing a first maximum-force-applied limit includes combining the second maximum-force-applied limit with another parameter.

23. The method of claim 22 wherein combining the second maximum-force-applied limit with another parameter includes summing the second maximum-force-applied limit with the another parameter.

24. The method of claim 21 wherein automatically using the second maximum-force-applied limit when operating the movable barrier operator includes automatically using the second maximum-force-applied limit when operating the movable barrier operator regardless of whether the first maximum-force-applied limit is also used.

25. The method of claim 21 wherein automatically using the second maximum-force-applied limit when operating the movable barrier operator includes using both the first and second maximum-force-applied limits when operating the movable barrier operator.

26. The method of claim 21 wherein providing a first maximum-force-applied limit includes providing a primary controller that uses the first maximum-force-applied limit.

27. The method of claim 26 wherein providing a second maximum-force-applied limit includes providing a secondary controller that uses the second maximum-force-applied limit.

28. The method of claim 27 wherein automatically using the second maximum-force-applied limit when operating the movable barrier operator includes having the secondary controller override operation of the primary controller.

29. The method of claim 28 wherein automatically using the second maximum-force-applied limit when operating the movable barrier operator includes automatically using the second maximum-force-applied limit to operate the movable barrier operator mode in a safety mode of operation.

30. The method of claim 29 wherein the safety mode of operation includes at least one of:
   stopping movement of a movable barrier;
   reversing movement of a movable barrier;
   providing an alarm.

31. The method of claim 21 wherein:
   providing a first maximum-force-applied limit includes providing a plurality of first maximum-force-applied limits as correspond to various positions of movable barrier travel;
   providing a second maximum-force-applied limit includes providing a plurality of second maximum-force-applied limits as correspond to the various positions of movable barrier travel;
   automatically using the first maximum-force-applied limit but not the second maximum-force-applied limit when operating the movable barrier operator includes automatically using the plurality of first maximum-force-applied limits but not the plurality of second maximum-force-applied limits when operating the movable barrier operator; and
   automatically using the second maximum-force-applied limit when operating the movable barrier operator includes automatically using the plurality of second maximum-force-applied limits when operating the movable barrier operator.

32. The method of claim 21 and further comprising:
   providing a first maximum-speed limit;
   providing a second maximum-speed limit, which second maximum-speed limit is less than the first maximum-speed limit;
   when input from a remotely located obstacle detector is available, automatically using the first maximum-speed when operating the movable barrier operator;
   when input from a remotely located obstacle detector is not available, automatically using the second maximum-speed limit when operating the movable barrier operator.

33. A movable barrier operator comprising:
first means for selecting causing a movable barrier to move;
controller means operably coupled to the first means for controlling movement of the movable barrier by using a first excess force threshold when an obstacle detector is operably coupled to the controller means and for controlling movement of the movable barrier by using a second excess force threshold, which second excess force threshold corresponds to a smaller excess force as compared to the first excess force threshold, when an obstacle detector is not operably coupled to the controller means.

34. The movable barrier operator of claim 33 wherein the controller means includes:
primary controller means for controlling movement of the movable barrier by using the first excess force threshold; and
secondary controller means for controlling movement of the movable barrier by using the second excess force threshold.

35. The movable barrier operator of claim 33 wherein the controller means is further operably coupled to the first means for controlling movement of the movable barrier by using a first maximum-speed limit threshold when an obstacle detector is operably coupled to the controller means and for controlling movement of the movable barrier by using a second maximum-speed limit threshold, which second maximum-speed threshold corresponds to a maximum-speed limit as compared to the first maximum-speed limit, when an obstacle detector is not operably coupled to the controller means.

36. A movable barrier operator comprising:
a movable barrier interface;
a controller having an obstacle detection input and being operably coupled to the movable barrier interface, and further having at least a first and a second automatic mode of operation, wherein:
pursuant to the first automatic mode of operation the controller operates the movable barrier interface in accordance with a first predetermined parameter regarding a first maximum permitted speed of movement as corresponds to movement of a movable barrier when the obstacle detection input is not operably coupled to at least one obstacle detector; and
pursuant to the second automatic mode of operation the controller operates the movable barrier interface in accordance with a second predetermined parameter regarding a second maximum permitted speed of movement as corresponds to movement of the movable barrier when the obstacle detection input is operably coupled to at least one obstacle detector.

37. The movable barrier operator of claim 36 wherein the obstacle detection input comprises an optically-based obstacle detector input.

38. The movable barrier operator of claim 36 wherein the obstacle detection input comprises a pressure-sensitive obstacle detector input.

39. The movable barrier operator of claim 36 wherein the obstacle detection input comprises a sonically-based obstacle detector input.

40. The movable barrier operator of claim 36 wherein the obstacle detection input comprises a radio frequency-based obstacle detector input.

41. The movable barrier operator of claim 36 and further comprising an obstacle detector detector that is operably coupled to the controller.

42. The movable barrier operator of claim 41 wherein the obstacle detector detector comprises a secondary controller.

43. The movable barrier operator of claim 42 wherein the secondary controller comprises a programmable apparatus.

44. The movable barrier operator of claim 43 wherein the programmable apparatus comprises at least one of:
a microprocessor;
a microcontroller;
a programmable gate array;
a customized logic array.

45. The movable barrier operator of claim 36 wherein the controller includes:
primary controller means for using the first predetermined parameter to control operation of the movable barrier interface;
secondary controller means for using the second predetermined parameter to control operation of the movable barrier interface.

46. The movable barrier operator of claim 45 wherein the secondary controller means controls operation of the movable barrier interface, at least in part, by influencing an input to the primary controller means.

47. The movable barrier operator of claim 46 wherein the secondary controller means controls operation of the movable barrier interface, at least in part, by diverting an input to the primary controller means.

48. The movable barrier operator of claim 47 wherein the input comprises an input that receives information that corresponds to movement of a movable barrier.

49. The movable barrier operator of claim 48 wherein the information comprises revolutions-per-minute information.

50. The movable barrier operator of claim 36 wherein the second predetermined parameter is based, at least in part, on the first predetermined parameter.

51. The movable barrier operator of claim 36 and further wherein:
pursuant to the first automatic mode of operation the controller operates the movable barrier interface in accordance with a plurality of first predetermined parameters regarding a plurality of first maximum permitted speeds that are allowed to be applied at various positions of movable barrier travel when the obstacle detection input is not operably coupled to at least one obstacle detector; and
pursuant to the second automatic mode of operation the controller operates the movable barrier interface in accordance with a plurality of second predetermined parameters regarding a plurality of second maximum permitted speeds that are allowed to be applied at the various position of movable barrier travel when the obstacle detection input is operably coupled to at least one obstacle detector.

52. A method for use with a movable barrier operator, comprising:
providing a first maximum-speed limit as corresponds to movement of a movable barrier;
providing a second maximum-speed limit as corresponds to movement of a movable barrier, which second maximum-speed limit is less than the first maximum-speed limit;
automatically detecting when input from a remotely located obstacle detector is available;
when input from a remotely located obstacle detector is available, automatically using the first maximum-speed limit but not the second maximum-speed limit when operating the movable barrier operator;

when input from a remotely located obstacle detector is not available, automatically using the second maximum-speed limit when operating the movable barrier operator.

53. The method of claim 52 wherein providing a first maximum-speed limit includes providing a primary controller that uses the first maximum-speed limit.

54. The method of claim 53 wherein providing a second maximum-speed limit includes providing a secondary controller that uses the second maximum-speed limit.

55. The method of claim 54 wherein automatically using the second maximum-speed limit when operating the movable barrier operator includes having the secondary controller override operation of the primary controller.

56. The method of claim 55 wherein automatically using the second maximum-speed limit when operating the movable barrier operator includes automatically using the second maximum-speed limit to operate the movable barrier operator mode in a safety mode of operation.

57. The method of claim 56 wherein the safety mode of operation includes at least one of:
   stopping movement of a movable barrier;
   reversing movement of a movable barrier;
   providing an alarm.

58. The method of claim 52 wherein:
   providing a first maximum-speed limit includes providing a plurality of first maximum-speed limits as correspond to various positions of movable barrier travel;
   providing a second maximum-speed limit includes providing a plurality of second maximum-speed limits as correspond to the various positions of movable barrier travel;
   automatically using the first maximum-speed limit but not the second maximum-speed limit when operating the movable barrier operator includes automatically using the plurality of first maximum-speed limits but not the plurality of second maximum-speed limits when operating the movable barrier operator; and
   automatically using the second maximum-speed limit when operating the movable barrier operator includes automatically using the plurality of second maximum-speed limits when operating the movable barrier operator.

59. A movable barrier operator comprising:

a movable barrier interface;

a controller having an obstacle detection input and being operably coupled to the movable barrier interface, and further having at least a first and a second automatic mode of operation, wherein:
   pursuant to the first automatic mode of operation the controller operates the movable barrier interface in accordance with a first predetermined parameter as corresponds to movement of a movable barrier when the obstacle detection input is not operably coupled to at least one obstacle detector; and
   pursuant to the second automatic mode of operation the controller operates the movable barrier interface in accordance with a second predetermined parameter as corresponds to movement of the movable barrier when the obstacle detection input is operably coupled to at least one obstacle detector.

* * * * *